April 13, 1926.
A. SAKSA
FAUCET
Filed March 4, 1922
1,580,681
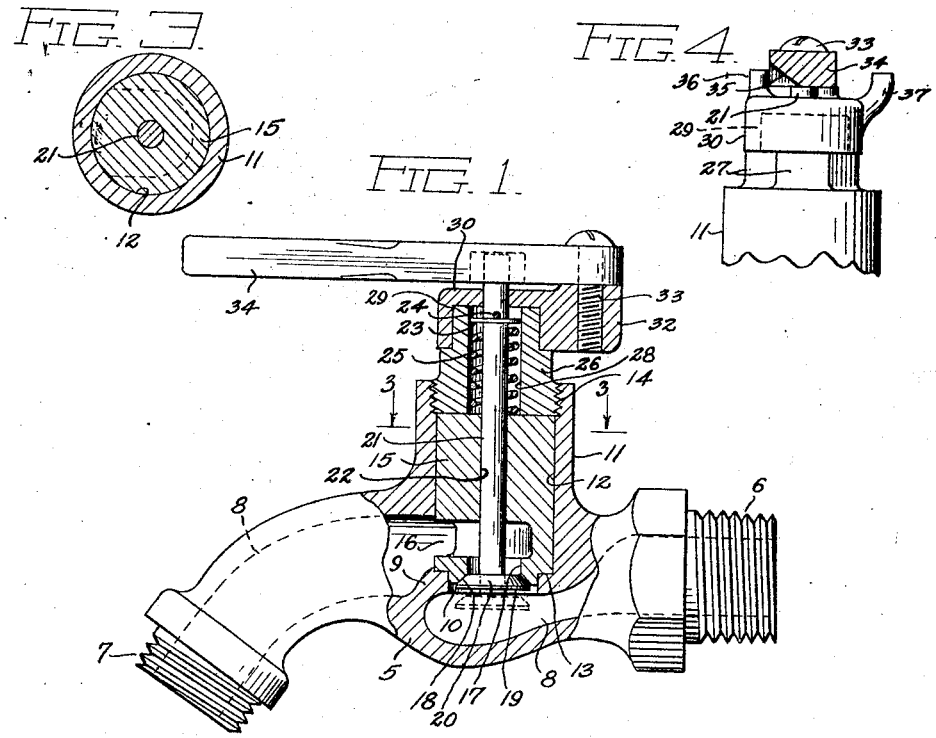
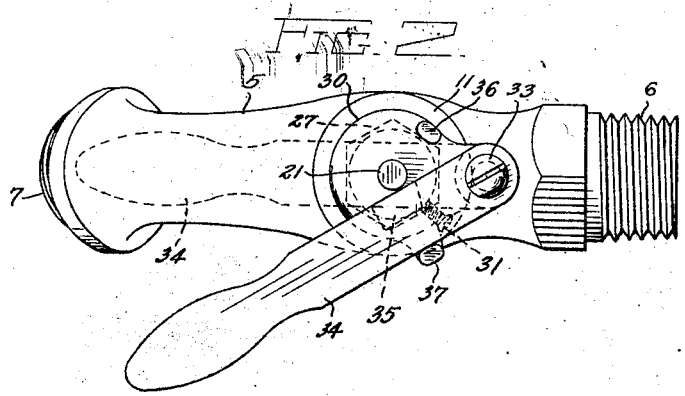
INVENTOR.
BY Andrew Saksa
Wooster & Davis
ATTORNEYS.

Patented Apr. 13, 1926.

1,580,681

UNITED STATES PATENT OFFICE.

ANDREW SAKSA, OF BRIDGEPORT, CONNECTICUT.

FAUCET.

Application filed March 4, 1922. Serial No. 541,048.

*To all whom it may concern:*

Be it known that I, ANDREW SAKSA, a citizen of the United States, residing at Bridgeport, county of Fairfield, State of Connecticut, have invented an Improvement in Faucets, of which the following is a specification.

This invention relates to valves, particularly quick acting valves, and has for an object to provide a valve which is simple in construction, and may be easily and cheaply manufactured, which will not require packing, and which will not be easily gotten out of order.

It is a further object of the invention to provide a valve in which the valve proper may be assembled outside the body and then with its casing inserted and secured within the body.

It is a still further object of the invention to provide a valve structure which will not require as much space as valves of the ordinary construction having an equal capacity.

With these and other objects in view, I have devised the structure illustrated in the accompanying drawing, in which—

Fig. 1 is a longitudinal, vertical section through the valve mechanism as applied to a faucet.

Fig. 2 is a top plan view of the faucet.

Fig. 3 is a transverse section substantially on the line 3—3 of Fig. 1, and

Fig. 4 is a detailed view of the valve operating mechanism.

For the purpose of illustrating my invention, I have shown it as applied to a faucet, but it is by no means limited to use therewith as it may be employed with angle valves, globe valves, and the like.

In the drawing, 5 represents the body of the faucet which is threaded, as usual, at 6 for connection with the supply pipe and it may or may not be threaded at 7 for the connection of a hose. Extending through the body portion is a fluid passage 8 across which extends a web or partition 9 provided with an opening 10 therein. At one side of the body is an extension 11 which is cylindrically bored at 12, the bore, in the form shown, terminating in an annular seat 13 surrounding the opening 10, and is threaded at its outer end as shown at 14.

The valve proper is a separate assembly which may be applied to the body as a unit, and comprises a cylindrical casing 15 adapted to be inserted in the bore 12 and rest at its inner end against the seat 13. It is cored adjacent its inner end providing a side outlet 16 and an inlet opening 17 through the end with a tapered annular valve seat 18 surrounding this opening. The valve 19 is preferably a disk having an inclined surface 20 adapted to fit the seat 18, and the valve is secured by any suitable means to a valve stem 21 slidably mounted in a longitudinal opening 22 in the casing. The stem projects beyond the outer end of the casing, and spaced from this end is provided with a washer 23 secured on the stem by any suitable means such as a pin 24, and surrounding the stem between the end of the casing and the washer is a spring 25 bearing at its opposite ends against the casing and the washer, and thus tending to hold the valve in its closed position. The valve casing is retained in the body against the seat 13 by means of a nut 26 threaded onto the threads 14 of the bore, and pressing against the outer end of the casing. It is preferably provided with flat sides 27 for the application of a wrench to clamp the casing in position and extending longitudinally through the same is a cylindrical opening 28 to enclose the spring 25. The upper end of this nut comprises a cylindrical portion 29 on which is mounted a support 30 for the valve operating mechanism. Any suitable operating mechanism may be employed, that shown being a simple and quickly operating construction. The support 30 fits over the cylindrical portion of the nut and is provided with an opening through which the end of the valve stem 21 projects, and is secured to this portion of the nut by any suitable means, such as a set screw 31. Projecting rearwardly from the support is a lug 32 provided with any suitable pivot such as a screw 33 for an operating handle 34. This handle is adapted to project forwardly over the valve stem and is provided with an inclined wall 35 forming a cam adapted to engage the top of the stem to press it and the valve downwardly to open the same when the handle 34 is swung on its pivot to a position over the discharge from the faucet, as will be evident from an inspection of Fig. 2. Suitable means are provided for limiting the movements of the handle, such as stop lugs 36 and 37 projecting upwardly from the support 30 on opposite sides of the handle.

It will be noted the valve structure is very simple with very little machining required, and what is required is straight and simple work. The casing 15 is easily turned up and drilled for the valve stem, and the valve seat finished, and after assembling with the valve therein and the spring positioned on the valve stem, is inserted in the bore within the body and clamped in position by means of the nut 26. The support 30 with the valve operating handle is then mounted on the nut and the valve is complete. If the valve becomes broken, or the valve or its seat becomes scored so that it leaks, all that is necessary is to unscrew the nut 26, remove the valve and its casing and insert a new one and clamp it in position by means of the nut. Ordinarily, no packing is required as the fluid pressure on the bottom of the valve holds it tightly against its seat and the casing is clamped tightly against the seat 13 so that the fluid will not leak out around this seat. If, however, it should be desired to use a packing ring between the casing and its seat, it will last indefinitely as there is no relative movement between these parts in operation. Also, if desired, packing may be placed around the valve stem within the casing, but this is not ordinarily necessary as the stem is on the low pressure side of the valve.

Having thus set forth the nature of my invention what I claim is:

1. A valve comprising a body having a passage therethrough, a partition across said passage having an opening, a valve casing seated in said opening and provided with a passage therethrough communicating with the first passage on opposite sides of the partition, a member separate from and independent of the valve casing, said member having threaded engagement with the body and adapted to clamp the valve casing in said opening, a valve seat carried by the casing on the inlet side of the passage, a valve on said seat and opening against the flow, a support removably mounted on the said member and also mounted for angular adjustment thereon, and means mounted on said support for operating the valve.

2. A valve comprising a body having a fluid passage therethrough and a cylindrical bore from one side terminating in a seat and threaded adjacent its outer end, a cylindrical valve casing in said bore and having a passage therethrough with a valve seat, a valve stem slidable in said casing and carrying a valve for said seat, a spring surrounding said stem and tending to hold the valve to its seat, a nut separate from and independent of the casing threaded in said bore to retain the casing against the seat in the body and enclosing said spring, and means to press against the outer end of the stem to remove the valve from its seat.

In testimony whereof I affix my signature.

ANDREW SAKSA.